US011445521B2

(12) United States Patent
Hu

(10) Patent No.: US 11,445,521 B2
(45) Date of Patent: Sep. 13, 2022

(54) SYSTEMS AND METHODS FOR LATENCY SENSITIVE LINKS

(71) Applicant: Meta Platforms Technologies, LLC, Menlo Park, CA (US)

(72) Inventor: Chunyu Hu, Saratoga, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 58 days.

(21) Appl. No.: 17/121,200

(22) Filed: Dec. 14, 2020

(65) Prior Publication Data

US 2021/0289512 A1    Sep. 16, 2021

Related U.S. Application Data

(60) Provisional application No. 62/989,412, filed on Mar. 13, 2020.

(51) Int. Cl.
| | |
|---|---|
| *H04W 72/08* | (2009.01) |
| *H04W 48/06* | (2009.01) |
| *H04W 72/04* | (2009.01) |
| *H04W 84/12* | (2009.01) |
| *H04W 74/08* | (2009.01) |

(52) U.S. Cl.
CPC ......... *H04W 72/087* (2013.01); *H04W 48/06* (2013.01); *H04W 72/048* (2013.01); *H04W 72/0446* (2013.01); *H04W 74/0875* (2013.01); *H04W 84/12* (2013.01)

(58) Field of Classification Search
None
See application file for complete search history.

(56) References Cited

U.S. PATENT DOCUMENTS

| | | | |
|---|---|---|---|
| 10,938,644 B2* | 3/2021 | Xiao | H04L 41/0806 |
| 2003/0043773 A1 | 3/2003 | Chang | |
| 2015/0327131 A1 | 11/2015 | Teyeb et al. | |

(Continued)

FOREIGN PATENT DOCUMENTS

| | | |
|---|---|---|
| EP | 3 030 034 A1 | 6/2016 |
| WO | WO-2010/099497 A1 | 9/2010 |

OTHER PUBLICATIONS

International Search Report and Written Opinion on non-Foley case related to U.S. Appl. No. 17/121,040 dated Aug. 11, 2021.

(Continued)

*Primary Examiner* — Hong S Cho
(74) *Attorney, Agent, or Firm* — Foley & Lardner LLP

(57) ABSTRACT

Disclosed herein includes a system, a method, and a device for providing latency sensitive links. A wireless device can receive, from a wireless node, an advertisement message indicating a set of wireless local area network (WLAN) links that support one or more defined latency requirements, a capability of the wireless node to support the set of WLAN links, a plurality of parameters, an operating mode, and a status for the set of WLAN links. The wireless device can send, to the wireless node responsive to the advertisement message, a request to access a first link of the set of WLAN links. The request can indicate a capability of the wireless device to interoperate with the wireless node to use the first link. The wireless device can access the first link of the set of WLAN links if the wireless node accepts the request to access the first link.

20 Claims, 5 Drawing Sheets

(56) References Cited

U.S. PATENT DOCUMENTS

2015/0341130 A1   11/2015   Zhou et al.
2017/0188268 A1*  6/2017   Montemurro ....... H04W 74/006
2017/0293945 A1   10/2017   Li
2021/0282186 A1    9/2021   Cherian et al.

OTHER PUBLICATIONS

International Search Report and Written Opinion on non-Foley case related to U.S. Appl. No. 17/121,200 dated Jun. 29, 2021.
Invitation to Pay Additional Fees on non-Foley case related to U.S. Appl. No. 17/121,040 dated Jun. 21, 2021.

\* cited by examiner

SYSTEMS AND METHODS FOR LATENCY SENSITIVE LINKS

CROSS-REFERENCE TO RELATED APPLICATION

This application claims priority to U.S. Provisional Patent Application No. 62/989,412, filed Mar. 13, 2020, which is incorporated by reference in its entirety for all purposes.

FIELD OF DISCLOSURE

The present disclosure is generally related to communications, including but not limited to providing latency sensitive links by an access point (AP) to one or more station (STA) devices.

BACKGROUND

Artificial reality such as a virtual reality (VR), an augmented reality (AR), or a mixed reality (MR) provides immersive experience to a user. In one example, a user wearing a head wearable display (HWD) can turn the user's head, and an image of a virtual object corresponding to a location of the HWD and a gaze direction of the user can be displayed on the HWD to allow the user to feel as if the user is moving within a space of an artificial reality (e.g., a VR space, an AR space, or a MR space). In one implementation, an image of a virtual object is generated by a console communicatively coupled or tethered to the HWD. In some setups, the console may have access to a wireless network and the HWD accesses the network via the console device.

SUMMARY

Devices, systems and methods for providing latency sensitive links are described herein. In some embodiments, a wireless node (e.g., access point (AP)) can provide differing levels of service for multi-level operations by dedicating one or more links for latency sensitive traffic to meet the requirements of latency sensitive applications. The latency sensitive applications can include, but are not limited to, augmented reality (AR) applications and virtual reality (VR) applications. The wireless node can configure the links having parameters designed to meet the requests or requirements of the latency sensitive applications. The wireless node can configure a subset of links having the parameters corresponding to latency sensitive link capabilities and can advertise the latency sensitive link capabilities to one or more wireless devices (e.g., plurality of station devices (STAs)). The wireless node can determine to accept or grant admission to one or more of the latency sensitive links based in part on the capabilities of the requesting wireless devices (e.g., station device, client device) and/or properties of network traffic associated with the respective wireless device. In some embodiments, the wireless node can use latency sensitive link capabilities, link admission and link steering techniques to provide and maintain a desired or targeted quality of service for latency sensitive applications.

In at least one aspect, a method is provided. The method can include receiving, by a wireless device from a wireless node, an advertisement message indicating a set of wireless local area network (WLAN) links that support one or more defined latency requirements, a capability of the wireless node to support the set of WLAN links, a plurality of parameters for the set of WLAN links, an operating mode for the set of WLAN links, and a status for the set of WLAN links. The method can include sending, by the wireless device to the wireless node responsive to the advertisement message, a request to access a first link of the set of WLAN links. The request can indicate a capability of the wireless device to interoperate with the wireless node to use the first link. The method can include accessing, by the wireless device, the first link of the set of WLAN links if the wireless node accepts the request to access the first link.

In some embodiments, the capability of the wireless node can include at least one of: link admission, link steering or facilitating channel access, of one or more wireless devices. The method can include receiving, by the wireless device from the wireless node, a response accepting or denying the wireless device access to the first link. In some embodiments, the response can be based on at least a condition of network traffic associated with the wireless node. The method can include receiving, by the wireless device from the wireless node, an indication of a second link to transfer at least a portion of traffic of the wireless device, from the first link to the second link. The indication can be responsive to a condition of network traffic associated with the wireless node. The method can include accessing, by the wireless device responsive to the indication, the second link to communicate the at least a portion of the traffic of the wireless device.

In some embodiments, the method can include receiving, by the wireless device from the wireless node, an indication of a first plurality of parameters of the plurality of parameters for a plurality of time slots for the set of WLAN links available for prioritized access. The method can include accessing, by the wireless device, the first link during a first time slot of the plurality of time slots according to the first plurality of parameters. The advertisement message can include at least one of: a beacon signal, a probe response or an action frame.

In at least one aspect, a wireless device is provided. The wireless device can include one or more processors configured to receive, from a wireless node, an advertisement message indicating a set of wireless local area network (WLAN) links that support one or more defined latency requirements, a capability of the wireless node to support the set of WLAN links, a plurality of parameters for the set of WLAN links, an operating mode for the set of WLAN links, and a status for the set of WLAN links. The wireless device can include one or more processors configured to send, to the wireless node responsive to the advertisement message, a request to access a first link of the set of WLAN links. The request can indicate a capability of the wireless device to interoperate with the wireless node to use the first link. The wireless device can include one or more processors configured to access the first link of the set of WLAN links if the wireless node accepts the request to access the first link.

The capability of the wireless node can include at least one of: link admission, link steering or facilitating channel access, of one or more wireless devices. The wireless device can include one or more processors configured to receive, from the wireless node, an indication of a second link to transfer at least a portion of traffic of the wireless device, from the first link to the second link. The indication can be responsive to a condition of network traffic associated with the wireless node. The wireless device can include one or more processors configured to access, responsive to the indication, the second link to communicate the at least a portion of the traffic of the wireless device.

In some embodiments, the wireless device can include one or more processors configured to receive, from the wireless node, a response accepting or denying the wireless device access to the first link. The response can be based on at least a condition of network traffic associated with the wireless node. The wireless device can include one or more processors configured to receive, from the wireless node, an indication of a first plurality of parameters of the plurality of parameters for a plurality of time slots for the set of WLAN links available for prioritized access. The wireless device can include one or more processors configured to access the first link during a first time slot of the plurality of time slots according to the first plurality of parameters. The advertisement message can include at least one of: a beacon signal, a probe response or an action frame.

In at least one aspect, a method is provided. The method can include configuring, by a wireless node, a set of wireless local area network (WLAN) links to support one or more defined latency requirements. The method can include transmitting, by the wireless node to a plurality of wireless devices, the advertisement message indicating the set of WLAN links that support one or more defined latency requirements, a capability of the wireless node to support the set of WLAN links, a plurality of parameters for the set of WLAN links, an operating mode for the set of WLAN links, and a status for the set of WLAN links. The method can include receiving, by the wireless node from a first wireless device of the plurality of wireless devices responsive to the advertisement message, a request to access a first link of the set of WLAN links. The request can indicate a capability of the wireless device to interoperate with the wireless node to use the first link. The wireless device can access the first link of the set of WLAN links if the wireless node accepts the request to access the first link.

In some embodiments, the capability of the wireless node can include at least one of: link admission, link steering or facilitating channel access, of one or more wireless devices. The method can include transmitting, by the wireless node to the first wireless device, a response accepting or denying the wireless device access to the first link. The response can be based on at least a condition of network traffic associated with the wireless node. The method can include transmitting, by the wireless node to the wireless device, an indication of a second link to transfer at least a portion of traffic of the wireless device, from the first link to the second link, responsive to a condition of network traffic associated with the wireless node. The wireless device can access, responsive to the indication, the second link to communicate the at least a portion of the traffic of the wireless device.

The method can include determining, by the wireless node, a condition of network traffic of the set of WLAN links. The method can include determining, by the wireless node, that the wireless device is accessing the first link and a second link of the set of WLAN links. The method can include determining, by the wireless node, not to transfer at least a portion of traffic of the wireless device from the first link to the second link, responsive to determining that the wireless device is accessing the second link. The method can include configuring, by the wireless node, a time interval into a plurality of time slots for the set of WLAN links having a first plurality of parameters of the plurality of parameters for prioritized access. The method can include transmitting, by the wireless node to the wireless device, an indication of the first plurality of parameters for the plurality of time slots for the set of WLAN links. The wireless device can access the first link during a first time slot of the plurality of time slots according to the first plurality of parameters. The advertisement message can include at least one of: a beacon signal, a probe response or an action frame.

In at least one aspect, a wireless node is provided. The wireless node can include one or more processors configured to configure a set of wireless local area network (WLAN) links to support one or more defined latency requirements. The wireless node can include one or more processors configured to transmit, to a plurality of wireless devices, the advertisement message indicating the set of WLAN links that support one or more defined latency requirements, a capability of the wireless node to support the set of WLAN links, a plurality of parameters for the set of WLAN links, an operating mode for the set of WLAN links, and a status for the set of WLAN links. The wireless node can include one or more processors configured to receive, from a first wireless device of the plurality of wireless devices responsive to the advertisement message, a request to access a first link of the set of WLAN links. The request can indicate a capability of the wireless device to interoperate with the wireless node to use the first link. The wireless device can access the first link of the set of WLAN links if the wireless node accepts the request to access the first link.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing. In the drawings.

DETAILED DESCRIPTION

Figure 1:
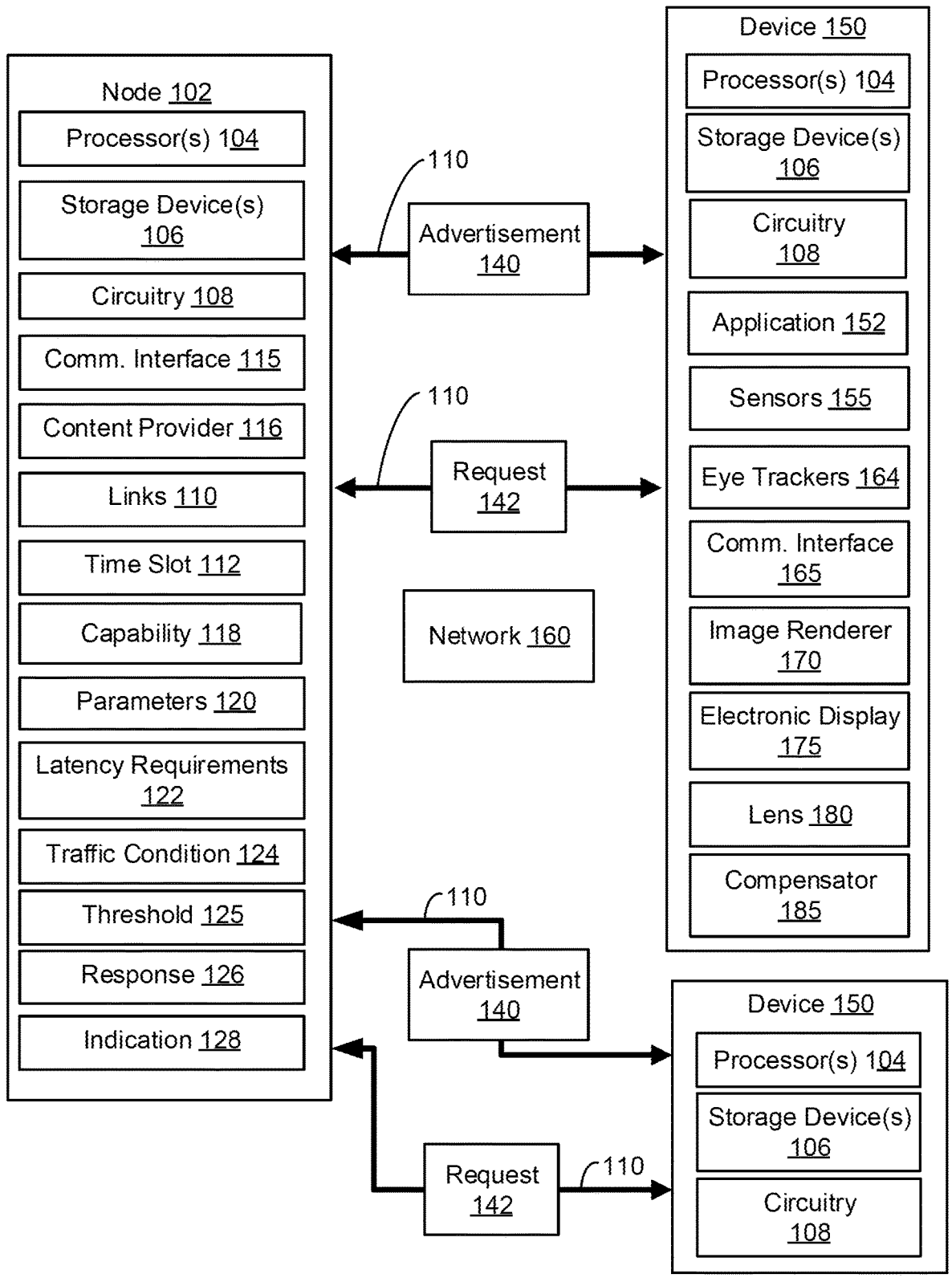
FIG. 1 is a diagram of a system for providing latency sensitive links, according to an example implementation of the present disclosure.

The subject matter of the present disclosure is directed to techniques for providing differing levels of service for multi-level operations by dedicating one or more links for latency sensitive traffic to meet the requirements of latency sensitive applications. The links are configured as latency sensitive links having parameters designed to meet the requests or requirements of latency sensitive applications. An access point (AP) device can configure a subset of links having latency sensitive link capabilities and can advertise the latency sensitive link capabilities to a plurality of station devices (STAs). The access point can grant admission to one or more of the latency sensitive links based in part on the capabilities of the requesting station device or client device and/or properties of network traffic associated with the station device or client device. The access point can use the latency sensitive link capabilities, link admission and link steering techniques to provide and maintain a desired or targeted quality of service for latency sensitive applications.

Some applications (e.g., AR/VR applications) can be more sensitive to latency issues when transmitting and receiving communications or data. The latency sensitive applications can include one or more downlink (DL) and/or one or more uplink (UL) streams having (pre)determined parameters. The amount of traffic for the latency sensitive applications can vary from interval to interval. The streams may include communications that are bursty or periodic. The latency sensitive applications can have increased bandwidth requirements. However, present communication protocols (e.g., WLAN protocols that are based on best effort support schemes) may not support the needs of latency sensitive traffic, for example, resulting in degraded/reduced user experience for an end user of the particular application.

The techniques described herein can provide differentiated quality of service over different links (e.g., wireless links) to meet the unique needs of latency sensitive applications. In some embodiments, including multi-link operations (e.g., 802.11 multi-link operation), an access point device (e.g., AP MLD) can offer differentiated quality of service over different wireless links. The access point device can configure a subset of links to provide the minimal/desired quality of service to meet the requirements of latency sensitive applications. The subset of links can be referred to as latency sensitive links (LSL) and the service provided through the latency sensitive links can be referred to as latency sensitive service (LSS). The latency sensitive links can be configured to have modified capability advertisement, link admission, link steering and/or channel access parameters to provide a latency sensitive application a requested or desired quality of service.

The access point device can configure the links having the latency sensitive capabilities (e.g., parameters) and can advertise the link capabilities to one or more station devices (e.g., non-AP devices). The link capabilities can be advertised in a beacon frame, probe response frame and/or any other form of management frames containing capability information. The advertisement can include a per link indication (e.g., LSL enable) to indicate that a specific link is a latency sensitive link. The station devices can use the link capability information to choose or request a network and one or links to conduct communication and enable a desired or target performance.

A client device can also indicate its capability of supporting latency sensitive link operations in a probe request, association request and any other form of management frames containing capability information (e.g., capability fields). The station device and/or client device can support latency sensitive link operations by providing, supporting or configuring a set of features or mechanisms that an access point device uses to provide latency sensitive service/support, including but not limited to, link admission, link steering, and an enhanced channel access mechanism.

The access point device can determine or select link admission for one or more station devices based in part on whether the respective station device supports latency sensitive links or parameters associated with latency sensitive links. During an association or admission period, the access point device can make a determination on whether a station device supports latency sensitive links based in part on a (reported) capability of the respective station device and network load information associated with the station device.

The access point device can use the capability field associated with the station device to determine if the station device supports latency sensitive links. If the station device does not support latency sensitive links as indicated in its capability field, the access point device can prevent or disable a link (e.g., prevent establishment of, or access to the link) between the access point device to the station device. The access point device can monitor network load information over a plurality of links associated with or used by the station device that supports latency service links and can make the determination on whether to accept the station device to operate on a latency sensitive link based in part on the properties of the network load information associated with the station device. In some embodiments, the access point device can accept or deny a station device if an amount of network traffic associated with the station device is above a traffic threshold, for example, to avoid congestion on the latency sensitive links and provide the targeted quality of service. If a station device is denied access to a latency sensitive link, the access point can provide access to a regular link or non-latency sensitive link to maintain connectivity and deliver data transfer over the other links.

The access point device can steer or transfer communications or traffic (e.g., link steering) associated with one or more station devices to particular links to maintain a desired or targeted quality of service for one or more latency sensitive links. After a connection is established between the access point device and a station device, the access point device continuously monitors the traffic load over the network and the plurality of links associated with the access point device. The access point device can invoke or perform link steering techniques to provide and maintain the advertised quality of service for the plurality of links. For example, link steering can include a current operating link and a new operating link (e.g., not being used) and the access point device can determine to steer or send traffic associated with a particular station device based in part on the traffic load associated with the station device. The access point device can direct a portion or all traffic and communications with the station device to the new operating link. In some embodiments, the selected portion of traffic and communications can include selected traffic streams and/or management frames.

The access point can provide prioritized channel access to latency sensitive applications to provide or maintain a desired or targeted quality of service for one or more latency sensitive links. The access point device can divide a medium time into slots having a determined duration and select or configure a portion of the slots as prioritized slots. The prioritized slots can be dedicated for latency sensitive applications and can have a different set of parameters as compared to parameters of the regular slots or non-prioritized slots. The access point device can select a fixed interval composed of fixed but configurable number of slots to provide flexible scheduling and priority access for certain types of latency sensitive traffic. In some embodiments, the access point device may use additional features to provide the increased quality of service for latency sensitive links including, but not limited to, limiting or controlling transmission opportunities for all traffic including latency sensitive traffic and other forms of traffic.

Referring now to FIG. 1, a system 100 for providing latency sensitive links 110 is depicted. In brief overview, the system 100 can include a wireless node 102 (e.g., access point) in communication with one or more wireless devices 150 (e.g., stations (STA)) through network 160. The wireless devices 150 can contend for or request access to latency sensitive links 110 provided by the wireless node 102 to communicate with the wireless node 102 and/or other wireless devices 150 for a variety of different transmissions including, but not limited to, downlink transmissions, uplink transmission and/or peer-to-peer transmissions. The wireless node 102 can provide one or more links 110 dedicated for latency sensitive traffic to meet the requirements of latency sensitive applications 152, augmented reality (AR) applications and/or virtual reality (VR) applications.

The wireless node 102 can include an access point (e.g., wireless access point) to provide a wireless network 160 or connect one or more wireless devices 150 to a wireless network 160. In some embodiments, the wireless node 102 can include a networking hardware device to create a wireless network 160 or provide connections to a wireless network 160. In some embodiments, the wireless node 102 can project a Wi-Fi signal to a designated area to create a wireless network 160 or provide connections to a wireless network 160. The wireless node 102 can connect to a router or be provided as a component of a router for connecting one or more wireless devices 150 to the wireless network 160. The wireless network 160 can include, but is not limited to a Wireless Local Area Network (WLAN)), a Local Area Network (LAN), a Wide Area Network (WAN), a Personal Area Network (PAN), company Intranet or the Internet through a variety of wireless or cellular connections. The wireless network 160 can include a public network, private network or a combination of a private network and a public network.

The wireless node 102 can include or correspond to a console providing content of artificial reality to one or more wireless devices 150 (e.g., head wearable display (HWD 150)). The wireless node 102 can determine a view within the space of the artificial reality corresponding to the detected location and the gaze direction, and generate an image depicting the determined view. The wireless node 102 may provide the image to a wireless device 150 (e.g., HWD) for rendering. In some embodiments, the system 100 can include or correspond to an artificial reality system environment that includes more, fewer, or different components than shown in FIG. 1. In some embodiments, functionality of one or more components of the artificial reality system environment 100 can be distributed among the components in a different manner than is described here. For example, some of the functionality of the wireless device 150 (e.g., console) may be performed by one or more wireless devices (e.g., HWDs). For example, some of the functionality of the wireless devices 150 (e.g., HWD) may be performed by the wireless node 102 (e.g., console).

The wireless node 102 can include a processor 104. The processor 104 can include any logic, circuitry and/or processing component (e.g., a microprocessor) for pre-processing input data for the wireless node 102, and/or for post-processing output data for the wireless node 102. The one or more processors 104 can provide logic, circuitry, processing component and/or functionality for configuring, controlling and/or managing one or more operations of the wireless node 102. For instance, a processor 104 may receive data and metrics, including but not limited to, capabilities 118, time slots 112, parameters 120 and/or latency requirements 122. In some embodiments, the processors 104 can include or correspond to a driver or host driver of the wireless node 102 to execute or perform one or more portions of the processes or methods (e.g., method 400) described herein. The processor 104 can be the same as or similar to processing units 516 described above with respect to FIG. 5.

The wireless node 102 can include a storage device 106. The storage device 106 can include a static random access memory (SRAM) or any other types of memory, storage drive or storage register. The storage device 106 can include a static random access memory (SRAM) or internal SRAM, internal to the wireless node 102. In some embodiments, the storage device 106 can be included within an integrated circuit of the wireless node 102. The storage device 106 can include a memory (e.g., memory, memory unit, storage device, etc.). The memory may include one or more devices (e.g., RAM, ROM, Flash memory, hard disk storage, etc.) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an example embodiment, the memory is communicably connected to the processor 104 via a processing circuit and includes computer code for executing (e.g., by the processing circuit and/or the processor) the one or more processes or methods (e.g., method 400) described herein. In some embodiments, the storage device 106 can include, be the same as or substantially similar to storage 518 of FIG. 5. The wireless node 102 can include circuitry 108. The circuitry 108 can be a component of or part of computing system 514 described with respect to FIG. 5. In some embodiments, the circuitry 108 can include a processor to perform all of or parts of method 400 described with respect to FIG. 4.

In some embodiments, the wireless node 102 is an electronic component or a combination of an electronic component (e.g., circuitry) and a software component that provides content to be rendered to one or more wireless devices 150. In one aspect, the wireless node 102 includes a communication interface 115 and a content provider 116. These components may operate together to determine a view (e.g., a FOV of the user) of the artificial reality corresponding to the location of a wireless device 150 and the gaze direction of the user of the wireless device 150, and can generate an image of the artificial reality corresponding to the determined view. In other embodiments, the wireless node 102 includes more, fewer, or different components than shown in FIG. 1. In some embodiments, the wireless node 102 is integrated as part of the wireless device 150. In some embodiments, the communication interface 115 is an electronic component or a combination of an electronic component and a software component that communicates with the wireless device 150. The communication interface 115 may be a counterpart component to the communication interface 165 to communicate with a communication interface 115 of the wireless node 102 through a communication link (e.g., USB cable) or communication channel. Through the communication channel, the communication interface 115 may receive from the wireless device 150 sensor measurements indicating the determined location and orientation of the wireless device 150 and/or the determined gaze direction of the user. Moreover, through the communication channel, the communication interface 115 may transmit to the wireless device 150 data describing an image to be rendered.

The content provider 116 is a component that generates content to be rendered according to the location and orientation of the wireless device 150 and/or the gaze direction of the user of the wireless device 150. In one aspect, the content provider 116 determines a view of the artificial reality according to the location and orientation of the wireless device 150 and/or the gaze direction of the user of the wireless device 150. For example, the content provider 116 maps the location of the wireless device 150 in a physical space to a location within an artificial reality space, and determines a view of the artificial reality space along a direction corresponding to an orientation of the wireless device 150 and/or the gaze direction of the user from the mapped location in the artificial reality space. The content provider 116 may generate image data describing an image of the determined view of the artificial reality space, and transmit the image data to the wireless device 150 through the communication interface 115. In some embodiments, the content provider 116 generates metadata including motion vector information, depth information, edge information, object information, etc., associated with the image, and transmits the metadata with the image data to the wireless device 150 through the communication interface 115. The content provider 116 may encode the data describing the image, and can transmit the encoded data to the wireless device 150. In some embodiments, the content provider 116 generates and provides the image to the wireless device 150 periodically (e.g., every one second).

The wireless node 102 can provide access to one or more access links 110 to one or more wireless devices 150 to perform DL transmission, UL transmissions and/or peer-to-peer transmission. The links 110 can be monitored and controlled using various timing mechanisms. For example, In some embodiments, the links 110 can monitored and managed based in part on a time period that is divided or partition into a plurality of time intervals. The time intervals can include fixed intervals or configurable intervals. The time intervals can be periodic intervals having the same duration. In some embodiments, the time intervals can be configurable intervals such that a first time interval has a different duration from one or more other time intervals. The wireless node 102 can divide or partition the time intervals into a plurality of time slots 112. The time slots 112 can include fixed time slots or configurable time slots, for example, having properties determined based in part on an amount of data to be communicated or transmitted. The time slots 112 can be periodic time slots 112 having the same duration. In some embodiments, the time slots 112 can have different durations such that a first time slot 112 has a different duration from one or more other time slots 112.

The wireless node 102 can configure the time slots 112 having different parameters 120 to provide prioritized access to a portion of the time slots 112 and regular or non-prioritized access to a portion of the time slots 112. For example, the wireless node 102 can configure a portion of the time slots having first parameters to provide prioritized access to the time slots 112 for one or more wireless devices 150 and a portion of the time slots having second parameters 120 (e.g., default parameters) to provide non-prioritized access or regular access to the time slots 112 for one or more wireless devices 150. The first parameters 120 and second parameters 120 can include or correspond to similar or the same parameters but have different values to provide a different level of access or quality of service using the respective channel. In some embodiments, a first parameter 120 can have a different value (e.g., higher value, lower value) from a second parameter 120. The parameters 120 can include, but are not limited to, enhanced distribution channel access (EDCA) parameters (e.g., prioritized EDCA), inter-frame spacing parameters (e.g., arbitrating inter-frame spacing (A-AIFS)), contention window parameters, a parameter for a timer (e.g., back-off timer parameters), and any parameters associated with the network 160 and/or links 110 between the node 102 and one or more devices 150. In some embodiments, the parameters 120 can include or correspond to latency sensitive requirements 122. The latency sensitive requirements 122 can include, but are not limited to, bandwidth requirements, data rates, and/or traffic amount limits.

The wireless node 102 can configure the time slots 112 having first parameters 120 to generate prioritized time slots 112, for example, for high latency application, AR applications and/or VR applications provided by one or more wireless devices 150. The wireless node 102 can assign or allocate the prioritized time slots 112 to one or more wireless devices 150 based in part on requests 142 received from the wireless devices 150 in response to an advertisement 140 identifying the prioritized time slots 112 to the wireless devices 150. The wireless node 102 can include or provide capabilities 118 to support latency sensitive links 110. The capabilities 118 can include, but are not limited to, capability advertisement, link admission, link steering, enhanced channel access and/or other mechanisms that provide latency sensitive applications a desired quality of service. The wireless node 102 can use the capabilities to configure and monitor the latency sensitive links 110 and maintain a desired or targeted quality of service for latency sensitive applications.

The wireless node 102 can determine one or more traffic conditions 124 of links 110 provided by the wireless node 102 and/or accessed by one or more wireless devices 150. The traffic condition 124 can include or correspond to properties of traffic transmitted through one or more links 110, such as but not limited to, a type of traffic (e.g., prioritized, non-prioritized, latency sensitive), a traffic amount, or total network load. In some embodiments, the traffic condition 124 can include a type of data transmitted between the wireless node 102 and the wireless devices 150. The traffic condition 124 can include data and information transmitted during DL operations, UL operations and/or peer-to-peer communications. In some embodiments, the traffic condition 124 can include different traffic types, such as but not limited to, prioritized traffic, non-prioritized traffic, traffic associated with latency sensitive applications, AR applications and/or VR applications.

The wireless node 102 can generate an advertisement 140 to advertise one or more latency sensitive links 110 (e.g., WLAN links) and a capabilities 118 of the wireless node 102. In some embodiments, the advertisement 140 can identify one or more prioritized time slots 112 for one or more latency sensitive links 110. The advertisement 140 can include a signal, a beacon signal, a probe response or an action frame. The advertisement 140 can include a data packet, command or set of instructions indicating the one or more latency sensitive links 110, the capabilities 118 of the wireless node 102 and/or the parameters 120 of one or more time slots 112. In some embodiments, the wireless node 102 can generate the advertisement 140 to include a per link indications to identify the set of links 110 out of a plurality of links 110 provided by the wireless node 102 configured as latency sensitive links 110 having parameters 120 (e.g., settings or a configuration) designed to meet the requests or requirements of latency sensitive applications. In some embodiments, the wireless node 102 can generate the advertisement 140 can include the first parameters 120 of the slots 112 indicating prioritized access to the respective slots 112 and/or the advertisement 140 can include second parameters 120 for regular or non-prioritized access to the slots 112.

In some embodiments, the wireless node 102 can generate a response 126 indicating whether a request 142 for a link 110 was accepted or denied. The response 126 can include a signal, a beacon signal, a probe response or an action frame. The response 126 can include a data packet, command or set of instructions indicating if a request 142 for a link 110 was accepted or denied. In some embodiments, the response 126 can indicate the reasons for denying the request 142, including but not limited to, a difference in capabilities 118, missing parameters, a traffic condition 124 (e.g., network load on the link 110) and/or missing/unsupported latency requirements 122. In some embodiments, the wireless node 102 can generate an indication 128 to indicate properties/configuration of a link 110, a link 110 to transfer traffic to, and/or an indication of parameters 120 of a link 110. The indication 128 can include a data packet, command or set of instructions. The indication can identify a second link 110, new link 110 or other link 110 to transfer at least a portion of traffic of the wireless device 150 from. The indication 128 can include parameters 120 for a plurality of time slots 112 for the set of WLAN links 110 available for prioritized access. In some embodiments, the indication 128 can include a per link indication 128 (e.g., LSL enable) to indicate that a specific link 110 is a latency sensitive link out of a plurality of links 110 available. In some embodiments, the wireless node 102 can use a threshold 125 to monitor the traffic conditions 124 on one or more links 110. The threshold 125 can include a limit, traffic load limit and/or value indicating a condition of a link 110. The threshold 125 can include a set of value(s) or range of values indicating an acceptable range. The wireless node 102 can assign a threshold 125 to a link 110 or to the set of links configured to support latency sensitive applications 152, for example, to maintain an intended or desired quality of service through the respective links 110.

The wireless device 150 can include a station (STA) device having the capability to use the 802.11 protocols. In some embodiments, the wireless device 150 can include a client device, head wearable device (HWD), computing system or WiFi device. In some embodiments, the wireless device 150 can be implemented, for example, as a wearable computing device (e.g., smart watch, smart eyeglasses, head wearable display), smartphone, other mobile phone, device (e.g., consumer device), desktop computer, laptop computer, a virtual reality (VR) puck, a VR personal computer (PC), VR computing device, a head mounted device, or implemented with distributed computing devices. The wireless device 150 can be implemented as, include, or be part of a head mounted display (HMD), head mounted device (HMD), head wearable device (HWD), head worn display (HWD) or head worn device (HWD). The wireless device 150 can be implemented to provide VR, augmented reality (AR), and/or mixed reality (MR) experience to a user (e.g., wearing the display) of the wireless device 150 or connected to the wireless device 150. In some embodiments, the wireless device 150 can include conventional, specialized or custom computer components such as processors 104, a storage device 106, a network interface, a user input device, and/or a user output device. In some embodiments, the wireless device 150 may include some elements of the HWD 150 shown in FIG. 2. In some embodiments, the wireless device 150 can provide or host one or more applications 152 including latency sensitive applications 152. The applications 152 can include, but are not limited to, a virtual reality (VR) application 152, an augmented reality (AR) application 152, or a mixed reality (MR) application 152.

In some embodiments, the wireless device 150 (e.g., HWD) is an electronic component that can be worn by a user and can present or provide an artificial reality experience to the user. The wireless device 150 may render one or more images, video, audio, or some combination thereof to provide the artificial reality experience to the user. In some embodiments, audio is presented via an external device (e.g., speakers and/or headphones) that receives audio information from the wireless device 150, the wireless node 102, or both, and presents audio based on the audio information. In some embodiments, the wireless device 150 includes sensors 155, eye trackers 164, a communication interface 165, an image renderer 170, an electronic display 175, a lens 180, and a compensator 185. These components may operate together to detect a location of the wireless device 150 and/or a gaze direction of the user wearing the wireless device 150, and render an image of a view within the artificial reality corresponding to the detected location of the wireless device 150 and/or the gaze direction of the user. In other embodiments, the wireless device 150 includes more, fewer, or different components than shown in FIG. 1.

The wireless device 150 can include one or more processors 104. The one or more processors 104 can include any logic, circuitry and/or processing component (e.g., a microprocessor) for pre-processing input data for transmissions to the wireless node 102 and/or another wireless device 150, and/or for post-processing output data for the wireless node 102 and/or wireless device 150. The one or more processors 104 can provide logic, circuitry, processing component and/or functionality for configuring, controlling and/or managing one or more operations of the wireless device 150. For instance, a processor 104 may receive data and metrics, including but not limited to, advertisements 140, capabilities 118, time slots 112, and/or parameters 120. In some embodiments, the processors 104 can include or correspond to a driver or host driver of the wireless device 150 to execute or perform one or more portions of the processes or methods (e.g., method 400) described herein. The processor 104 can be the same as or similar to processing units 516 described above with respect to FIG. 5.

The wireless device 150 can include a storage device 106. The storage device 106 can be designed or implemented to store, hold or maintain any type or form of data associated with the wireless device 150. For example, the wireless device 150 can store data associated with advertisements 140, capabilities 118, time slots 112, and/or parameters 120. The storage device 106 can include a static random access memory (SRAM) or internal SRAM, internal to the wireless device 150. In some embodiments, the storage device 106 can be included within an integrated circuit of the wireless device 150. The storage device 106 can include a memory (e.g., memory, memory unit, storage device, etc.). The memory may include one or more devices (e.g., RAM, ROM, Flash memory, hard disk storage, etc.) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an example embodiment, the memory is communicably connected to the processor 104 via a processing circuit and includes computer code for executing (e.g., by the processing circuit and/or the processor) the one or more processes or methods (e.g., method 400) described herein. In some embodiments, the storage device 106 can include, be the same as or substantially similar to storage 518 of FIG. 5. The wireless device 150 can include circuitry 108. The circuitry 108 can be a component of or part of computing system 514 described with respect to FIG. 5. In some embodiments, the circuitry 108 can include a processor to perform all of or parts of method 400 described with respect to FIG. 4.

The wireless device 150 can generate a request 142 to an advertisement 140. The request 142 can include a data packet, command, or set of instructions requesting access to one or more links 110 and/or time slots 112, including prioritized time slots 112. The request 142 can indicate the capabilities 118 of the wireless device. The capabilities 118 of the wireless device 150 can include, but are not limited to, broadcast/sending of capability advertisement, link admission, link steering, enhanced channel access and/or other mechanisms that can provide latency sensitive applications a desired quality of service. The wireless device 150 can use the capabilities 118 to access latency sensitive links 110 and support or provide a targeted quality of service for latency sensitive applications 152. The request 142 can identify at least one link 110 to access. The request 142 can identify (e.g., for/with the link 110) a time slot 112, multiple time slots 112 (e.g., contiguous time slots), a type of traffic (e.g., downlink (DL) traffic, uplink (UL) traffic, peer-to-peer traffic), types of applications 152 (e.g., latency sensitive applications, AR/VR applications) associated with the wireless device 150 and/or an predicted amount or level of traffic associated with the applications supported by the wireless device 150.

In some embodiments, the sensors 155 include electronic components or a combination of electronic components and software components that detect a location and an orientation of the wireless device 150. Examples of sensors 155 can include: one or more imaging sensors, one or more accelerometers, one or more gyroscopes, one or more magnetometers, or another suitable type of sensor that detects motion and/or location. For example, one or more accelerometers can measure translational movement (e.g., forward/back, up/down, left/right) and one or more gyroscopes can measure rotational movement (e.g., pitch, yaw, roll). In some embodiments, the sensors 155 detect the translational movement and the rotational movement, and determine an orientation and location of the wireless device 150. In one aspect, the sensors 155 can detect the translational movement and the rotational movement with respect to a previous orientation and location of the wireless device 150, and determine a new orientation and/or location of the wireless device 150 by accumulating or integrating the detected translational movement and/or the rotational movement. Assuming for an example that the wireless device 150 is oriented in a direction 25 degrees from a reference direction, in response to detecting that the wireless device 150 has rotated 20 degrees, the sensors 155 may determine that the wireless device 150 now faces or is oriented in a direction 45 degrees from the reference direction. Assuming for another example that the wireless device 150 was located two feet away from a reference point in a first direction, in response to detecting that the wireless device 150 has moved three feet in a second direction, the sensors 155 may determine that the wireless device 150 is now located at a vector multiplication of the two feet in the first direction and the three feet in the second direction.

In some embodiments, the eye trackers 164 include electronic components or a combination of electronic components and software components that determine a gaze direction of the user of the wireless device 150. In some embodiments, the eye trackers 164 include two eye trackers, where each eye tracker 164 captures an image of a corresponding eye and determines a gaze direction of the eye. In one example, the eye tracker 164 determines an angular rotation of the eye, a translation of the eye, a change in the torsion of the eye, and/or a change in shape of the eye, according to the captured image of the eye, and determines the relative gaze direction with respect to the wireless device 150, according to the determined angular rotation, translation and the change in the torsion of the eye. In one approach, the eye tracker 164 may shine or project a predetermined reference or structured pattern on a portion of the eye, and capture an image of the eye to analyze the pattern projected on the portion of the eye to determine a relative gaze direction of the eye with respect to the wireless device 150. In some embodiments, the eye trackers 164 incorporate the orientation of the wireless device 150 and the relative gaze direction with respect to the wireless device 150 to determine a gate direction of the user. Assuming for an example that the wireless device 150 is oriented at a direction 30 degrees from a reference direction, and the relative gaze direction of the wireless device 150 is −10 degrees (or 350 degrees) with respect to the wireless device 150, the eye trackers 164 may determine that the gaze direction of the user is 20 degrees from the reference direction. In some embodiments, a user of the wireless device 150 can configure the wireless device 150 (e.g., via user settings) to enable or disable the eye trackers 164. In some embodiments, a user of the wireless device 150 is prompted to enable or disable the eye trackers 164.

In some embodiments, the communication interface 165 includes an electronic component or a combination of an electronic component and a software component that communicates with the wireless node 102. The communication interface 165 may communicate with a communication interface 115 of the wireless node 102 through a communication link or communication channel. The communication channel may be a wireless link, a wired link, or both. Examples of the wireless link can include a cellular communication link, a near field communication link, Wi-Fi, Bluetooth, ultra wide bandwidth (UWB), or any other communication wireless communication link. Examples of the wired link can include a USB, Ethernet, Firewire, HDMI, or any wired communication link. In the embodiments, in which the wireless node 102 and the wireless device 150 are implemented on a single system, the communication interface 165 may communicate with the wireless node 102 through a bus connection or a conductive trace. Through the communication channel, the communication interface 165 may transmit to the wireless node 102 sensor measurements indicating the determined location of the wireless device 150 and the determined gaze direction of the user. Moreover, through the communication channel, the communication interface 165 may receive from the wireless node 102 sensor measurements indicating or corresponding to an image to be rendered.

In some embodiments, the image renderer 170 includes an electronic component or a combination of an electronic component and a software component that generates one or more images for display, for example, according to a change in view of the space of the artificial reality. In some embodiments, the image renderer 170 is implemented as a processor (or a graphical processing unit (GPU)) that executes instructions to perform various functions described herein. The image renderer 170 may receive, through the communication interface 165, data describing an image to be rendered, and render the image through the electronic display 175. In some embodiments, the data from the wireless node 102 may be encoded, and the image renderer 170 may decode the data to generate and render the image.

In one aspect, the image renderer 170 receives the encoded image from the wireless node 102, and decodes the encoded image, such that a communication bandwidth between the wireless node 102 and the wireless device 150 can be reduced. In one aspect, the process of detecting, by the wireless device 150, the location and the orientation of the wireless device 150 and/or the gaze direction of the user wearing the wireless device 150, and generating and transmitting, by the wireless node 102, a high resolution image (e.g., 1920 by 1080 pixels, or 2048 by 1152 pixels) corresponding to the detected location and the gaze direction to the wireless device 150 may be computationally exhaustive and may not be performed within a frame time (e.g., less than 11 ms or 8 ms). In one aspect, the image renderer 170 generates one or more images through a shading process and a reprojection process when an image from the wireless device 150 is not received within the frame time. For example, the shading process and the reprojection process may be performed adaptively, according to a change in view of the space of the artificial reality.

In some embodiments, the electronic display 175 is an electronic component that displays an image. The electronic display 175 may, for example, be a liquid crystal display or an organic light emitting diode display. The electronic display 175 may be a transparent display that allows the user to see through. In some embodiments, when the wireless device 150 is worn by a user, the electronic display 175 is located proximate (e.g., less than 3 inches) to the user's eyes. In one aspect, the electronic display 175 emits or projects light towards the user's eyes according to image generated by the image renderer 170.

In some embodiments, the lens 180 is a mechanical component that alters received light from the electronic display 175. The lens 180 may magnify the light from the electronic display 175, and correct for optical error associated with the light. The lens 180 may be a Fresnel lens, a convex lens, a concave lens, a filter, or any suitable optical component that alters the light from the electronic display 175. Through the lens 180, light from the electronic display 175 can reach the pupils, such that the user can see the image displayed by the electronic display 175, despite the close proximity of the electronic display 175 to the eyes.

In some embodiments, the compensator 185 includes an electronic component or a combination of an electronic component and a software component that performs compensation to compensate for any distortions or aberrations. In one aspect, the lens 180 introduces optical aberrations such as a chromatic aberration, a pin-cushion distortion, barrel distortion, etc. The compensator 185 may determine a compensation (e.g., predistortion) to apply to the image to be rendered from the image renderer 170 to compensate for the distortions caused by the lens 180, and apply the determined compensation to the image from the image renderer 170. The compensator 185 may provide the predistorted image to the electronic display 175.

The wireless node 102 can provide or establish one or more links 110 through the network 160 to one or more wireless devices 150. In some embodiments, the wireless device 150 can establish one or more links 110 through the network 160 to the wireless node 102 and/or one or more other wireless devices 150 (e.g., peer-to-peer transmissions). The links 110 can include latency sensitive links 110 and regular or default links 110. The latency sensitive links 110 can support latency sensitive applications and be configured having prioritized parameters 120. In some embodiments, the latency sensitive links 110 can be configured having capabilities 118. In some embodiments, the wireless node 102 can use the capabilities 118 to provide latency sensitive links 110. The remaining links 110 or regular links 110 can be configured having non-prioritized parameters 120, regular parameters 20 or default parameters 120 that are different from the prioritized parameters 120. The links 110 can include, but are not limited to, a communication channel, primary link, connection (e.g., wireless connection), and/or session (e.g., user and/or application session) established between the wireless node 102 and one or more wireless devices 150. The links 110 can be established using a communication protocol, including but not limited to, IEEE 802.11 based protocol, Bluetooth based protocol, UWB protocol, WiFi based protocol or cellular based protocol. In one embodiment, the links 110 include IEEE 802.11ay protocol or 802.11ax protocol. The wireless node 102 and wireless devices 150 can use the links 110 to perform a data transfer for downlink operations, uplink operations and/or peer-to-peer transmissions between two or more wireless devices 150. The wireless node 102 and wireless devices 150 can use the links 110 to provide or support a full VR experience, AR experience or MR experience for a user of a wireless device 150 or a device (e.g., head wearable display) connected to a wireless device 150.

Figure 2:
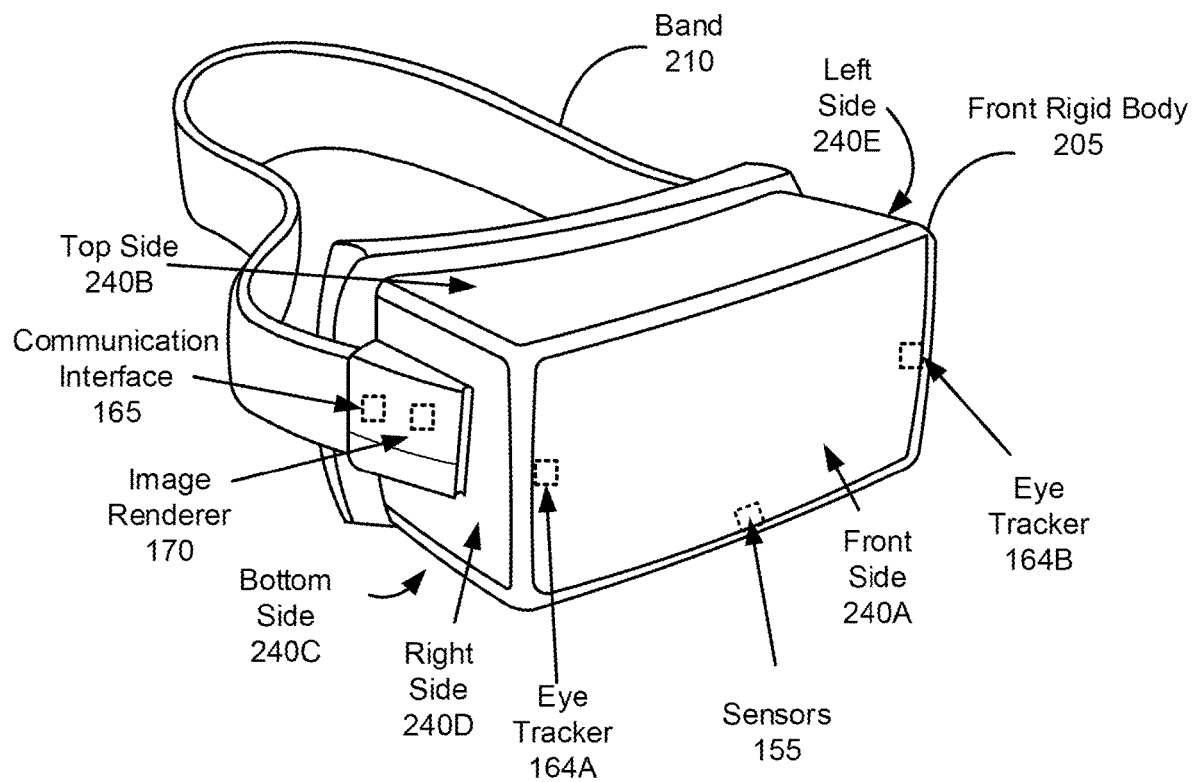
FIG. 2 is a diagram of a head wearable display, according to an example implementation of the present disclosure.

FIG. 2 is a diagram of a HWD wireless device 150, in accordance with an example embodiment. In some embodiments, the HWD wireless device 150 includes a front rigid body 205 and a band 210. The front rigid body 205 includes the electronic display 175 (not shown in FIG. 2), the lens 180 (not shown in FIG. 2), the sensors 155, the eye trackers 164A, 164B, the communication interface 165, and the image renderer 170. In the embodiment shown by FIG. 2, the sensors 155 are located within the front rigid body 205, and may not visible to the user. In other embodiments, the HWD wireless device 150 has a different configuration than shown in FIG. 2. For example, the image renderer 170, the eye trackers 164A, 164B, and/or the sensors 155 may be in different locations than shown in FIG. 2.

Figure 3:
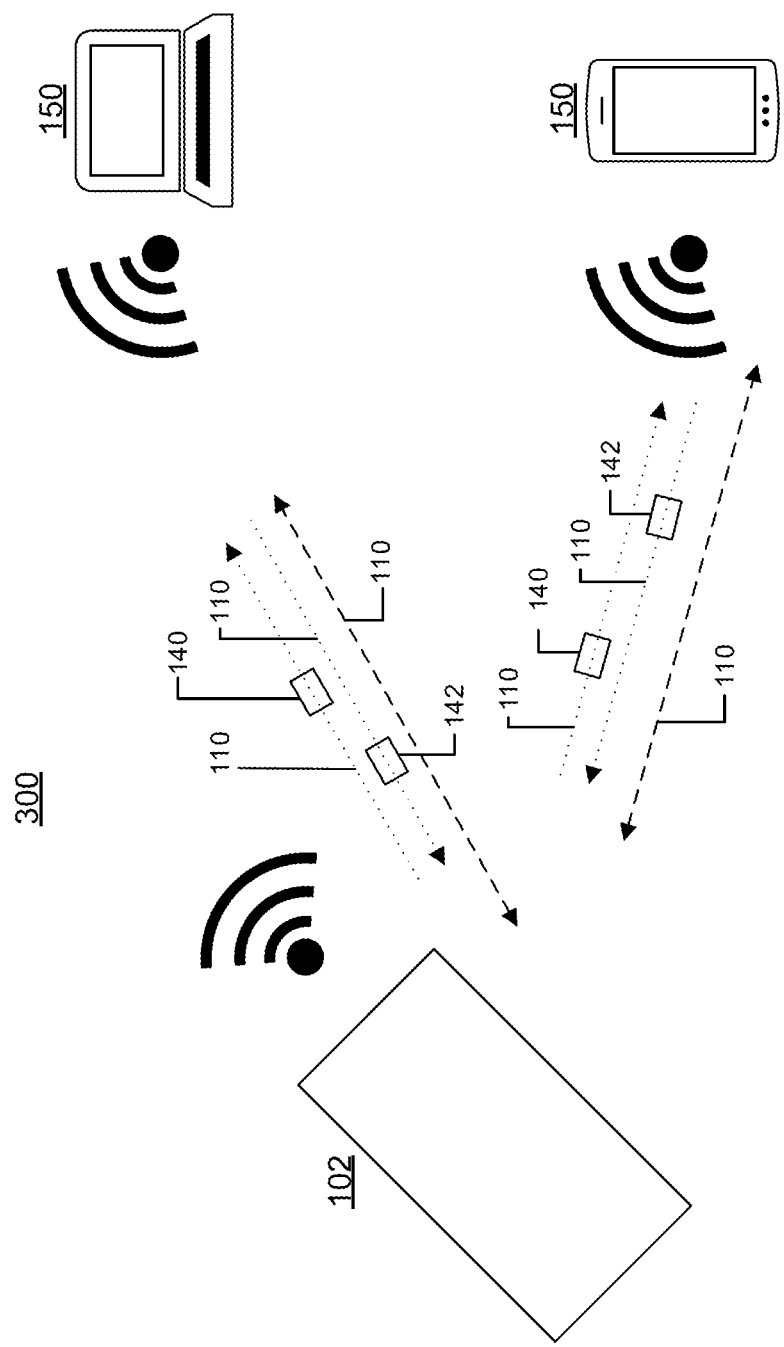
FIG. 3 is a diagram depicting a wireless node advertising a plurality of links to wireless devices, according to an example implementation of the present disclosure.

Now referring to FIG. 3, a diagram 300 having a wireless node 102 (e.g., access point) advertising a plurality of links 110 to a plurality of wireless devices 150 is provided. The wireless node 102 can provide multi-link operation by offering different levels of quality of service through different wireless links 110. A set, portion or subset of links 110 provided by the wireless node 102 can be designated for or configured to meet the requirements of latency sensitive applications 152, for example, for AR type applications and/or VR type applications. The wireless node 102 can configure a set of links 110 (e.g., portion of all links, subset of all links) having different parameters 120 (e.g., configurations) and capabilities 118 from a different set of links 110 (e.g., portion of all links, subset of all links) provided through the wireless node 102. In some embodiments, the links 110 can be configured as latency sensitive links 110 having parameters 120 designed to meet the requests or requirements of latency sensitive applications.

The wireless node 102 can transmit an advertisement message 140 to the wireless devices 150 through a wireless network 160 to indicate the capabilities 118 of the wireless node 102 and identify the links 110 configured as latency sensitive links 110. The capabilities 118 of the wireless node 102 to support latency sensitive traffic can include capability advertisement, link admission, link steering and/or enhanced channel access parameters 120 (e.g., EDCA channel access). In some embodiments, the advertisement 140 can indicate capabilities 118 or a capability threshold that a wireless device 150 may include to support and/or access a latency sensitive link 110. The advertisement 140 can include a beacon frame, probe response frame and/or other form of management frames containing capability information. In some embodiments, the advertisement 140 can include a per link indication to identify the set of links 110 out of a plurality of links 110 provided by the wireless node 102 configured as latency sensitive links 110 having parameters 120 designed to meet the requests or requirements of latency sensitive applications.

The wireless devices 150 can receive the advertisement message 140 and can determine the capabilities 118 of the wireless node 102. In some embodiments, the wireless devices 150 can determine if the respective wireless device 150 supports or provides the same capabilities 118 as the wireless node 102. For example, the wireless devices 150 can determine if the respective wireless device 150 supports or provides capability advertisement, link admission, link steering and/or enhanced channel access parameters 120 (e.g., EDCA channel access). One or more of the wireless devices 150 can transmit a request 142 indicating the capability 118 of the transmitting wireless device 150 and at least one link 110 the wireless devices 150 requests access to. In some embodiments, a wireless device 150 can transmit a request 142 to access a first link 110 of the set of latency sensitive links 110 (e.g., WLAN links) advertised by the wireless node 102.

The wireless node 102 can receive a request 142 from one wireless device 150 or multiple wireless devices 150. The wireless node 102 can determine or select link admission for one or more wireless devices 150 using the indicated capability 118 in the request 142 and based in part on whether the respective wireless device 150 supports latency sensitive links 110 or parameters 120 associated with latency sensitive links 110. In some embodiments, the wireless node 102 can transmit or provide a response 126 to a request 142 from a wireless device 150 indicating if the wireless device 150 was admitted or allowed access to the requested link 110 or if the wireless device 150 was denied or prevented access to the requested link 110.

The wireless devices that support latency sensitive links 110 can access the links 110 to communicate data, for example, for downlink operations, uplink operations, and peer-to-peer transmissions. The wireless node 102 can monitor various network load information over the set of latency sensitive links 110, including but not limited to a traffic load and traffic conditions on the links 110. In some embodiments, the load on a link 110 can be compared to a threshold to determine if the link 110 is overloaded, congested or the amount/condition of traffic on the link 110 is reducing a quality of service of the link 110 for an end user via the wireless device 150.

If the traffic on one or more links 110 exceeds a threshold, the wireless node 102 can perform link steering to reduce the load on the link 110 and/or balance the load between multiple links 110. For example, the wireless node 102 can select a new link 110 to transfer all or a portion of the traffic on the overloaded link 110 to. In some embodiments, the wireless node 102 can determine the wireless device 150 is connected to or given access to multiple latently sensitive links 110 and the wireless node 102 can transfer all or a portion of the load from the overloaded link 110 to one or more of the other links 110 the wireless device 150 is connected to or given access to.

In some embodiments, the wireless node 102 can provide prioritized channel access to the latency sensitive links 110 for latency sensitive applications 152 to maintain a desired or targeted quality of service. The wireless node 102 can divide a medium time of the links 110 into slots 112 having a determined duration and select or configure a portion of the slots 112 as prioritized slots 112. The prioritized slots 112 can be dedicated for latency sensitive applications and can have a different set of parameters 120 as compared to parameters 120 of the regular slots 112 or non-prioritized slots 112 for the set of links 110 provided by the wireless node 102. The wireless node 102 may use additional features to provide the increased quality of service for latency sensitive links 110 including, but not limited to, limiting or controlling transmission opportunities for all/some traffic including latency sensitive traffic and other forms of traffic.

Figure 4:
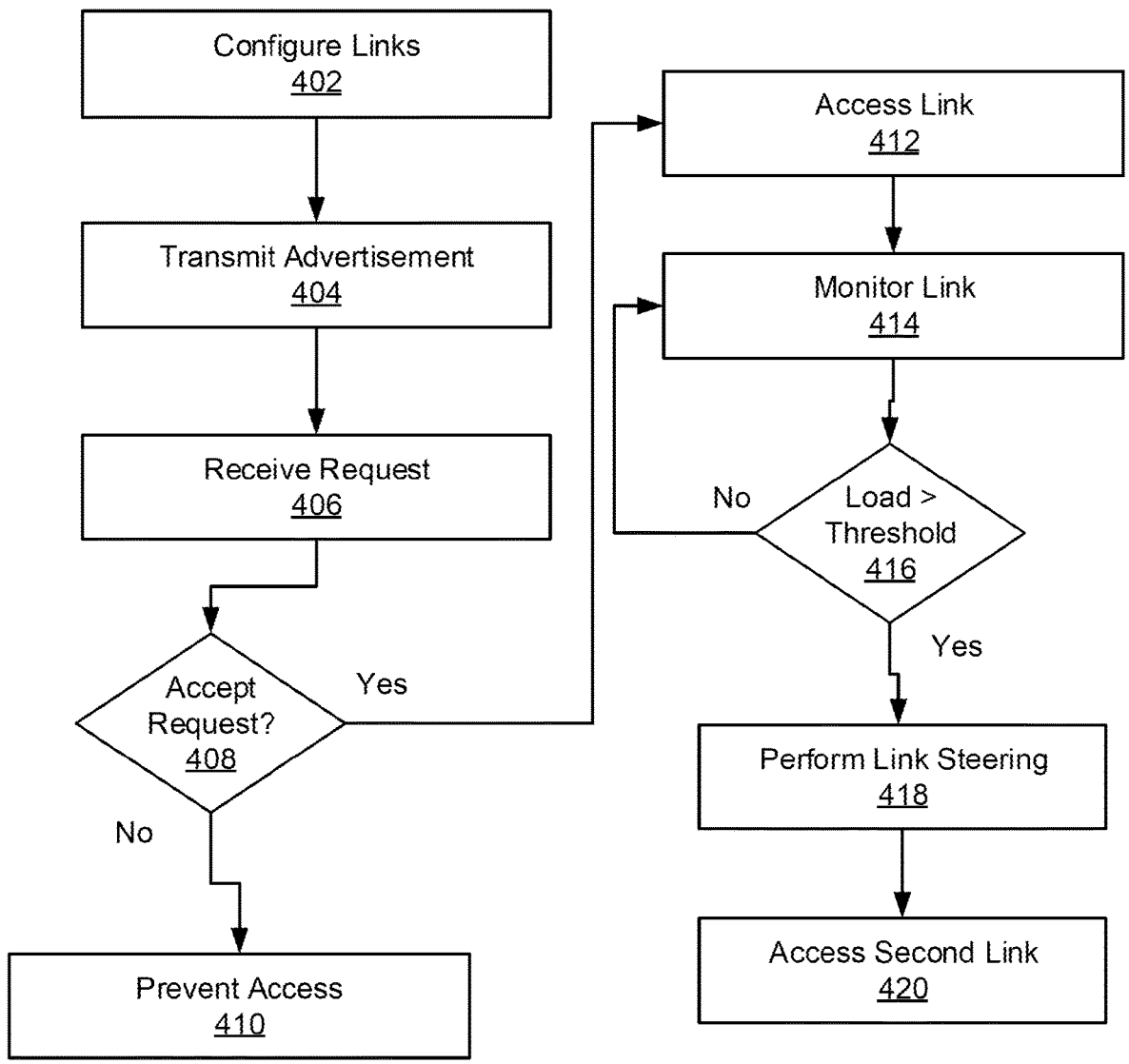
FIG. 4 is a flow chart illustrating a process or method for providing latency sensitive links, according to an example implementation of the present disclosure.

Now referring to FIG. 4, a method 400 for providing latency sensitive links is provided. In brief overview, the method 400 can include configuring links (402), transmitting an advertisement (404), receiving a request (406), determining to accept the request (408), preventing access to a link (410), accessing a link (412), monitoring one or more links (414), determining if a load is greater than a threshold (416), performing link steering (418), and/or accessing a second link (420). One or more of these operations may be performed by at least one processor and/or circuitry (e.g., processor 104, circuitry 108).

At operation 402, and in some embodiments, a set of links 110 can be configured to support latency sensitive applications 152. In some embodiments, a wireless node 102 (e.g., access point) can configure a set of wireless local area network (WLAN) links 110 to support one or more defined latency requirements 122. The wireless node 102 can provide a plurality of links 110 for one or more wireless devices 150 (e.g., STA, client devices) to communicate data for downlink operations, uplink operations, peer-to-peer communications and/or other types of communications between the wireless node 102 and one or more wireless devices 150. A subset or portion of the links 110 can be configured as latency sensitive links 110 having parameters 120 designed to meet the requests or requirements 122 of latency sensitive applications 152. In some embodiments, the wireless node 102 can configure or provide differing levels of service for multi-level operations by dedicating one or more links 110 for latency sensitive traffic and one or more links 110 having default or regular parameters 120 for regular or non-latency sensitive traffic. In some embodiments including multi-link operations (e.g., 802.11 multi-link operation), the wireless node 102 (e.g., AP MLD) can offer differentiated quality of service over different wireless links 110.

The wireless node 102 can configure the set of links 110 based in part on the latency requirements 122 of applications, including but not limited to, AR applications and/or VR applications. The links 110 can include or be referred to as latency sensitive links (LSL) and the service provided through the latency sensitive links can be referred to as latency sensitive service (LSS). The wireless node 102 can configure the latency sensitive links 110 by supporting/having/using modified capability advertisement, link admission, link steering and channel access parameters 120 to provide a latency sensitive application 152 a requested or desired quality of service. The wireless node 102 can configure the latency sensitive links 110 by enabling additional protocols or features to support latency sensitive applications 152, including, but is not limited to, pEDCA for latency sensitive traffic. The selected parameters 120 can include the parameters of the selected protocol, default parameters 120 or parameters 120 generated to support latency sensitive traffic. In embodiments, a first portion or first set of links 110 can be configured having/supporting different parameters 120 from a second portion or second set of links 110. The wireless node 102 can configure the first portion or first set of links 110 having first parameters 120 and configure the second portion or second set of links 110 having second parameters 120. The first parameters 120 can be different from the second parameters 120. In some embodiments, values of the first parameters 120 can be different from values of the second parameters 120 such that the first parameters meet the latency requirement 122 of latency sensitive applications 152.

In some embodiments, the wireless node 102 can divide or partition links 110 into a plurality of time slots 112 based in part on a determined time period. For example, the wireless node 102 can divide or partition the time period for a link 110 into a plurality of time intervals having a determined duration. The time intervals can be of equal duration or length. In some embodiments, one or more of the time intervals can be a different duration from one or more other time intervals. The wireless node 102 can configure, divide or partition the time intervals into a plurality of slots 112 (e.g., time slots 112). The time slots 112 can have a determined duration or length. The duration of the time slots 112 can be determined based in part on types of data transmission and communications between the wireless node 102 and one or more wireless devices 150 and/or one or more other wireless nodes 102, including but not limited to, transmit opportunity properties and data frame exchange properties. In some embodiments, the wireless node 102 can select the duration of the time slots 112 to correspond to, align with or match a transmit opportunity (txop) level of granularity, for example, to be long enough to hold or contain one or more data frame exchanges. The wireless node 102 can determine a duration of the time slots 112 to support downlink transmissions, uplink transmissions and/or peer-to-peer transmissions between one or more wireless devices 150. In some embodiments, the time slots 112 for a common or same time interval and/or time period can be of equal duration or length. In some embodiments, one or more of the time slots 112 for a common or same time interval and/or time period can be a different duration from one or more other time intervals.

The wireless node 102 can configure the time slots 112 having different parameters 120. The wireless node 102 can configure one or more of the time slots 112 having a first plurality of parameters 120 (e.g., first parameters 120) and one or more time slots 112 having a second plurality of parameters 120 (e.g., second parameters 120). The first parameters 120 can include or correspond to prioritized parameters for prioritized access to a respective slot 112. The wireless node 102 can configure a portion of the time slots 112 having first parameters 120 to provide a more predictable or reliable access to the respective time slots 112 for high latency applications, AR applications and/or VR applications. The second parameters 120 can include or correspond to regular or default parameters for regular access to a respective slot 112.

The first parameters 120 can include enhanced distribution channel access (EDCA) parameters for prioritized access to a respective slot. In some embodiments, the first parameters 120 and second parameters 120 can include a parameter of a time interval duration that includes one or more of the slots 112, a parameter for slot duration, a parameter for contention window, a parameter for a back-off timer or a parameter for interframe spacing. In some embodiments, the first parameters 120 can be a different value from the second parameters 120. The wireless node 102 can configure a portion of the time slots 112 having first parameters 120 to support latency sensitive traffic, for example, associated with AR applications and/or VR applications. The latency sensitive traffic can include or correspond to periodic and/or bursty traffic, and the amount of traffic can vary, for example, during downlink transmissions or uplink transmission, or peer-to-peer transmissions. In some embodiments, the traffic may complete (e.g., complete DL, complete UL) prior to the end of a current service period (e.g., group of contiguous time slots 112) or a single time slot 112. The wireless node 102 can assign and give priority access during prioritized time slots 112 to latency sensitive traffic based in part on requests 142 received from wireless devices and if the respective traffic completes prior to the end of a time slot 112, non-prioritized or regular traffic can access the remaining portion of the priority slot, e.g., to support multi-link operations and provide flexible scheduling.

The wireless node 102 can configure the prioritized time slots 112 to support or handle a certain range of traffic amount variations of latency sensitive traffic (e.g., priority traffic) in each time interval. For example, an initial portion or beginning of a service period (or prioritized time slot 112) can be protected or configured to tolerate small variations of time packets being ready to transmit (e.g., from Application layer operation/triggering to wake-up time). The service period (or priority slot) can be protected or configured to apply second parameters 120 (e.g., A-AIF S) for non-prioritized or regular traffic and maintain default parameters for the non-prioritized or regular traffic). The service period (or prioritized time slot 112) can be released (e.g., automatically) when the priority traffic completes.

At operation 404, and in some embodiments, an advertisement 140 can be transmitted. The wireless node 102 can transmit, to a plurality of wireless devices 150, the advertisement message 140 indicating the set of WLAN links 110 that support one or more defined latency requirements 122, a capability 118 of the wireless node 102 to support the set of WLAN links 110, a plurality of parameters 120 for the set of WLAN links 110, an operating mode for the set of WLAN links 110, and a status for the set of WLAN links 110. The wireless node 102 can transmit the advertisement 140 to each wireless device 150 in the network 160 and/or connected to the wireless node 102. In some embodiments, the wireless node 102 can select one or more wireless devices 150 and transmit the advertisement 140 to the selected wireless devices 150.

In some embodiments, the wireless node 102 can configure the links 110 having the latency sensitive capabilities 118 (e.g., parameters 120) and advertise the link capabilities 118 to one or more wireless devices 150 (e.g., STA devices, non-AP devices). The wireless devices 150 can receive the advertisement 140 indicating and/or identifying the set of links 110 out of a plurality of links 110 provided by the wireless node that support one or more defined latency requirements 122 and the capability 118 of the wireless node 102 to support the set of links 110. The advertisement 140 can be transmitted as a beacon signal, a probe response, an action frame and/or any other form of management frames containing capability information. In some embodiments, the advertisement 140 can include a per link indication 128 (e.g., LSL enable) to indicate that a specific link 110 is a latency sensitive link out of a plurality of links 110 that are available. The wireless devices 150 can use the capability information 118 to choose or request a network 160 and one or links 110 to conduct communication and enable a desired or target performance.

In some embodiments, the wireless node 102 can transmit or broadcast the advertisement 140 to indicate the parameters 120 (e.g., protocol configuration parameters) of time slots 112 for the latency sensitive links 110. The advertisement 140 can include first parameters 120 of the slots 112 indicating prioritized access to the respective slots 112 and/or the advertisement 140 can include second parameters 120 for regular or non-prioritized access to the slots 112. In some embodiments, the parameters 120 can a duration (e.g., length in terms of time) of a time interval, a duration (e.g., length in terms of time) of one or more slots 112, enhanced distribution channel access (EDCA) parameters, inter-frame spacing parameters (e.g., arbitrating inter-frame spacing (A-AIFS)), contention window parameters, a parameter for a back-off timer, and any parameters associated with the network 160 and/or links 110 between the node 102 and one or more devices 150. In some embodiments, the parameters 120 can indicate priority EDCA (pEDCA), for example, configured for latency sensitive traffic. The advertisement 140 can indicate an operating mode and/or status of the latency sensitive links 110. The operating mode can include an indication of how a link 110 is configured, a current status of the respective link 110, link 110 properties, an indication of how the network is configured, a current network status and/or network 160 properties. The status can include slot 112 assignments, a current slot status, and an indication of which slots 112 are assigned to which devices 150.

In some embodiments, the wireless node 102 can transmit a message indicating a second plurality of time slots 112 for non-prioritized access to communicate data to the wireless node 102 and/or between wireless devices 150 through one or more of the links 110. The wireless devices 150 can receive, from the wireless node 102, a message indicating the second plurality of time slots 112 for non-prioritized access to communicate data. The second plurality of time slots 112 or non-prioritized time slots 112 can be associated with a second plurality of parameters 120 different from the first plurality of parameters 120. In some embodiments, the second plurality of time slots 112 or non-prioritized time slots 112 can be configured having the second plurality of parameters 120 or default parameters 120.

At operation 406, and in some embodiments, a request 142 can be received. The wireless node 102 can receive, from a first wireless device 150 of the plurality of wireless devices 150 responsive to the advertisement message 140, a request 142 to access a first link 110 of the set of WLAN links 110. The request can indicate the capability 118 of the wireless device 150 to interoperate with the wireless node 102 to use the first link 110. In some embodiments, one or more wireless devices 150 can send, to the wireless node 102 responsive to the advertisement message 140, a request 142 to access a first link 110 or one or more links 110 of the set of WLAN links 110. The requests 142 can indicate the capability of respective the wireless devices 150 to interoperate with the wireless node 102 to use the first link 110. In some embodiments, the wireless devices 150 (e.g., STA devices, client devices) can support latency sensitive link operations by providing, supporting or configuring a set of features or mechanisms that the wireless node 102 (e.g., access point) uses to provide latency sensitive service, including but not limited to, link admission, link steering, and an enhanced channel access mechanism. The wireless device 150 can select a first link 110 or multiple links 110 to request access to and transmit the request 142 indicating the selected links 110. The wireless device 150 (e.g., STA, client device) can indicate its capability of supporting latency sensitive link operations in a probe request 142, association request 142 and any other form of management frames containing capability information (e.g., capability fields). The wireless device 150 can include in the request 142 the parameters 120 and/or latency requirements 122 of the link 110 that the respective wireless device 150 supports. In some embodiments, the request 142 can include an identifier for the requesting wireless device 150. The request 142 can identify or indicate one or more traffic conditions 124, a type of traffic (e.g., downlink (DL) traffic, uplink (UL) traffic, peer-to-peer traffic), types of applications 152 (e.g., latency sensitive applications, AR applications, VR applications) associated with the wireless device 150 and/or an estimated amount or level of traffic associated with the applications 152 supported by the wireless device 150. The wireless device 150 can transmit the request 142 to the wireless node 102, for example, through one or more links 110 to the wireless node 102 over the network 160. In some embodiments, the wireless device 150 can establish a connection or communication channel to the wireless node 102 responsive to receiving the advertisement and to transmit the request 142.

At operation 408, and in some embodiments, a determination can be made to accept the request 142 or deny the request 142. The wireless node 102 can determine or select link admission for one or more wireless devices 150 based in part on whether the respective wireless device 150 supports latency sensitive links 110, parameters 120 associated with latency sensitive links and/or latency requirements 122. The wireless node 102 can receive the request 142 for the first link 110 and/or a plurality of requests 142 from a plurality of wireless devices 150 and perform an association or admission operation to determine to accept or the deny the request requests 142. In some embodiments, during the association or admission period, the wireless node 102 can make the determination on whether a wireless device 150 supports latency sensitive links 110 based in part on a capability 118 of the respective wireless device and network load information (e.g., amount of traffic per application 152, total amount of traffic) associated with the wireless device 150.

The wireless node 102 can identify or determine the capabilities 118 of a wireless device 150 based in part on a capability field associated included with a request 142 and/or associated with a wireless device 150 to determine if the wireless device 150 supports latency sensitive links 110. For example, In some embodiments, if the wireless device 150 does not support latency sensitive links 110 as indicated in its capability field, the wireless node 102 can prevent or disable a link 110 between the wireless node 102 and the wireless device 150. In some embodiments, the wireless node 102 can compare the capabilities 118 of a requesting wireless device 150 to the advertised capabilities 118 of the requested link 110 to determine whether to accept or deny a request 142. For example, the wireless node 102 can compare the capabilities 118 of a wireless device 150 as indicated in a received request 142 to the advertised capabilities 118 of the advertised link 110.

In some embodiments, if capabilities 118 of the wireless device 150 are different from (e.g., less than, greater than) or outside a tolerance threshold (e.g., numerical threshold, percentage threshold, threshold range of acceptable values) of the advertised capabilities 118 of the requested link 110, the wireless node 102 can deny the request 142, and the method can move/proceed to (410). In one embodiment, if a requesting wireless device 150 does not support each of the capabilities 118 (e.g., link admission, link steering, parameters 120, EDCA channel access parameters 120, load traffic amounts) of a requested link 110 or less than all of the advertised capabilities 118, the wireless node 102 can deny the request 142, and the method can move/proceed to (410).

In some embodiments, if capabilities 118 of the wireless device 150 are the same (e.g., same values, same parameters 120) as or within a tolerance threshold (e.g., numerical threshold, percentage threshold, threshold range of acceptable values, acceptable number of capabilities in common) of the advertised capabilities 118 of the requested link 110, the wireless node 102 can accept the request 142, and the method can move/proceed to (412). In one embodiment, if a requesting wireless device 150 supports each of the capabilities 118 (e.g., link admission, link steering, parameters 120, EDCA channel access parameters 120, load traffic amounts) of a requested link 110, the wireless node 102 can accept the request 142, and the method can move/proceed to (412).

At operation 410, and in some embodiments, a request 142 can be denied. The wireless node 102 can deny or prevent a wireless device 150 from accessing a requested link 110 based in part on the wireless device 150 not supporting the capabilities 118 of the requested link 110 and/or the wireless device 150 having one more capabilities 118 different from the capabilities 118 of the requested link 110. In some embodiments, the wireless node 102 can deny or prevent a wireless device 150 from accessing a requested link 110 based in part on a traffic condition 124 (e.g., type, level or amount of traffic) associated with the wireless device 150, for example, that may cause the requested link 110 to exceed a traffic threshold or reduce a quality of service parameters 120 of the requested link 110 if the wireless device 150 accesses the requested link 110. In some embodiments, the wireless node 102 can disable access to a link 110 in response to determining the wireless device 150 does not support the latency sensitive link 110 and/or the capabilities 1148 of the latency sensitive link 110. In some embodiments, the wireless node 102 can disable access to the a link 110 in response to determining that the wireless device 150 does not meet a criterion of using the link 110, such as the wireless device 150 carrying a certain type of traffic with latency requirements within a certain level. The wireless node 102 can identify at least one active link 110 between the wireless node 102 and the wireless device 150 and determine that the link 110 is a latency sensitive link 110. The wireless node 102 can disable the link 110 between the wireless node 102 and the wireless device 150. In some embodiments, the wireless node 102 can transmit a response to the wireless device 150 denying the wireless device 150 access to the first link 110 or requested link 110. The response 126 can be based on at least a condition of network traffic 124 associated with the wireless node 102 or wireless device 150. In some embodiments, the response 126 can indicate the reasons for the denying the request 142, including but not limited to, a difference in capabilities 118, missing parameters, a traffic condition 124, failure to meet a criteria, and/or missing latency requirements 122.

At operation 412, and in some embodiments, the link 110 can be accessed. The wireless device 150 can access the first link 110 of the set of WLAN links 110 if the wireless node 102 accepts the request 142 to access the first link 110. In some embodiments, the wireless node 102 can transmit a response 126 to the wireless device 150 accepting the wireless device 150 access to the first link 110 or requested link 110. The wireless device 150 can access the first link 110 according to the capabilities 118 advertised for the link 110 to support one or more high latency applications 152 provided by the wireless device 150. The wireless device 150 can access the first link 110 using the parameters 120 and/or latency requirements 122 indicated for the link 110. In some embodiments, the wireless device 150 can perform downlink operations, uplink operations and/or peer-to-peer transmissions using the first link 110 and the according to the parameters 120 of the first link 110. The wireless device 150 can transmit, receive and/or communicate traffic associated with AR/VR type applications or latency sensitive applications using the first link 110.

In some embodiments, the wireless device 150 can access the first link 110 according the parameters 120 configured for the first link 110, including but not limited to, channel access parameters 120, EDCA parameters, prioritized contention window parameters (e.g., size), and/or prioritized alternate inter-frame spacing parameters. The wireless device 150 can access the first link 110 according the parameters 120 for prioritized access at an assigned or designated time slot 112 for more predictable access (e.g., assigned access, scheduled access) to the first link 110. The parameters 120 can be assigned to or configured for the first link 110 by the wireless node 102 and the wireless device 150 can perform downlink operations, uplink operations and/or peer-to-peer transmissions using the parameters 120 to support or maintain a desired or targeted quality of service for latency sensitive applications 152 provided by (e.g., hosted, executing at) the wireless device 150. In some embodiments, the latency sensitive parameters or first parameters 120 for latency sensitive applications 152 can be more aggressive than regular or second parameters 120 (e.g., default parameters) for regular access to one or more other links 110.

In some embodiments, the wireless node 102 can access the link 110 at an assigned or determined time slot 112 and according to parameters 120 of the respective link 110. The wireless device 150 can receive, from the wireless node 102, an indication 128 of parameters 120 for a plurality of time slots 112 for the set of WLAN links 110 available for prioritized access. The wireless device 150 can access the first link 110 during a first time slot 112 of the plurality of time slots 112 according to the first plurality of parameters 120. In some embodiments, the wireless device 150 can access the first time slot 112 using a timer function and/or back-off timer parameters 120 configured to enable or provide prioritized access to the assigned time slot 112 of the link 110. In some embodiments, the timer can indicate a time period or time frame when access to the assigned time slot 112 of the link 110 is restricted to the wireless device 150. The time slot 112 can include a time boundary indicating a time period (e.g., X amount of time before prioritized access begins, X amount of time after prioritized access begins or ends) when regular traffic or traffic associated with another wireless device 150 is prevented or not allowed to access the assigned time slot 112 of the link 110. Thus, the assigned time slot 112 of the link 110 can be assigned to the wireless device 150 to avoid, prevent or reduce the chances of a collision with another wireless device 150 attempting to access the link 110 at the assigned time slot 112.

At operation 414, and in some embodiments, the link 110 can be monitored. The wireless node 102 can monitor the first link 110 or the set of links 110 configured to support latency sensitive traffic. In some embodiments, the wireless node 102 can monitor network load information over a plurality of links 110 associated with or used by one or more wireless devices 150 that supports latency sensitive links 110 and make the determination to maintain a link 110 to a wireless device 150, disable a wireless link 110 to a wireless device 150 or transfer traffic associated with a wireless device 150 from a first link 110 to a second link 110. The wireless node 102 can detect or determine one or more traffic conditions 124 of the links 110. The traffic conditions 124 can include, but are not limited to, an amount of traffic on the link 110, a type of traffic on the link 110, a network load value (e.g., total traffic on a link or a set of latency sensitive links) for each of the set of links configured for latency sensitive applications 152, and/or a network load value for each of the plurality of links 110 (e.g., total traffic on all links) provided by the wireless node 102. The wireless node 102 can continuously monitor the traffic conditions 124 of one or more links 110 and can dynamically determine the traffic conditions 124 for one or more links 110.

At operation 416, and in some embodiments, a traffic condition 124 can be compared to a threshold 125. The threshold 125 can include a limit, traffic load limit and/or value indicating a condition of a link 110. The threshold 125 can include a set of one or more values or range of values indicating an acceptable range. The wireless node 102 can assign a threshold 125 to a link 110 or to the set of links configured to support latency sensitive applications 152, for example, to maintain an intended or desired quality of service through the respective links 110. In some embodiments, if a traffic condition 124 of a link 110 exceeds the threshold 125 for the link 110 or a threshold 125 for the set of latency sensitive links 110, the wireless node 102 can determine that the respective link 110 is congested, approaching a condition of congestion and/or is experiencing a reduced quality of service, for example, for a user of the wireless device 150.

The wireless node 102 can compare the traffic condition 124 of the link 110 to the threshold 125. If the traffic condition 124 of the link 110 is less than the threshold 125 or within the threshold range 125, the method 400 can proceed or return to (414) and the wireless node 102 can continue monitoring the traffic conditions 124 of the link 110. If the traffic condition 124 of the link 110 is greater than the threshold 125 or outside the threshold range 125, the method 400 can move/proceed to (418).

At operation 418, and in some embodiments, link steering can be performed. The wireless node 102 can steer or transfer communications or traffic (e.g., perform link steering) associated with one or more wireless devices to particular links 110 to maintain a desired or targeted quality of service for one or more latency sensitive links 110. In some embodiments, after a link 110 is established between the wireless node 102 and a wireless device 150, the wireless node 102 continuously monitors the traffic conditions 124 (e.g., traffic load) over the network 160 and/or the plurality of links 110 associated with the wireless node 102. The wireless node 102 can invoke or perform link steering techniques to provide and maintain the advertised quality of service for the plurality of links 110. For example, link steering can be performed between a current operating link 110 and a new operating link 110 (e.g., second link 110, additional link 110) and the wireless node 102 can determine to steer or send traffic associated with a particular wireless device 150 based in part on the traffic conditions 124 (e.g., traffic load) associated with the wireless device 150, the current operating link 110 and/or the new operating link 110.

The wireless node 102 can direct a portion or all traffic of communications associated with the wireless device 150 to a second link 110 or new operating link 110. In some embodiments, the wireless node 102 can direct or transfer selected traffic streams from the wireless device 150 and/or management frames from the wireless device to a second link 110 or new operating link 110. The second link 110 may include an existing link 110 that the wireless device 150 is accessing, has access to or previously requested access to. The new operating link 110 can include a new link 110 established in response to the overload condition, a new link 110 the wireless device 150 is provided access to and/or an existing link 110 the wireless device 150 is provided access to. The amount of traffic or the size of the portion of traffic to be transferred can be determined based in part on the amount of traffic on the first link 110 and/or the amount the traffic on the first link 110 exceeds the threshold 125. For example, the wireless node 102 can transfer a portion of the traffic from one link 110 to a second or additional link 110 to reduce the traffic level on the first link 110 below the threshold 125 and/or balance the traffic associated with the wireless device 150 between the first link 110 and the second link 110 such that the traffic on both the first link 110 and the second link 110 is less than the threshold 25. In some embodiments, the selected portion of traffic and communications can include selected traffic streams and/or management frames.

The wireless node 102 can determine that the traffic condition 124 of a link 110 has exceeded the threshold 125 and determine what other links 110 the respective wireless device 150 accessing the first link 110 is also accessing or is assigned. For example, the wireless node 102 can determine if the wireless device 150 is accessing multiple links 110 or has been given access to multiple links 110. In some embodiments, the wireless node 102 can determine a condition of network traffic 124 of the set of WLAN links 110 and determine that/whether the wireless device 150 is accessing the first link 110 and a second link 110 of the set of WLAN links 110. In some embodiments, the wireless node 102 can determine to transfer at least a portion of traffic of the wireless device 150 from the first link 110 to the second link 110, responsive to determining that the wireless device 150 is accessing the second link 110 (or not accessing the second link 110). In some embodiments, the wireless node 102 can determine not to transfer at least a portion of traffic of the wireless device 150 from the first link 110 to the second link 110, responsive to determining that the wireless device is accessing the second link 110. For example, the wireless node 102 can determine that the wireless device 150 is already accessing multiple links 110 (e.g., first and second links 110) and the wireless 102 does not need to select a new or different operating link 110.

At operation 420, and in some embodiments, a second or additional link 110 can be accessed. The wireless device 150 can access the second link 110 of the set of WLAN links 110 or a new operating link 110 based in part on an indication, instruction or command from the wireless node 102. The wireless device 150 can transfer a portion of the traffic from the first link 110 or all of the traffic to the second link 110 (or new operating link 110) based in part on an indication, instruction or command from the wireless node 102. In some embodiments, the portion can include an amount, percentage, identified traffic streams and/or management frames. The wireless device 150 can access the second or new link 110 according to the capabilities 118 advertised for the link 110 to support one or more high latency applications 152 provided by the wireless device 150. The wireless device 150 can access the second or new link 110 using the parameters 120 and/or latency requirements 122 indicated for the link 110. In some embodiments, the wireless device 150 can perform downlink operations, uplink operations and/or peer-to-peer transmissions using the second or new link 110 and according to the parameters 120 of the first or second/new link 110. The wireless device 150 can transmit, receive and/or communicate traffic associated with AR/VR type applications or latency sensitive applications using the second or new link 110.

In some embodiments, the wireless device 150 can receive, from the wireless node 102, an indication 128 of a second link 110 to transfer at least a portion of traffic of the wireless device 150, from the first link 110 to the second link 110. The indication can be responsive to a traffic condition 124 (e.g., a condition of network traffic) associated with the wireless node 102 and/or wireless device 150. In some embodiments, the indication can be transmitted by the wireless node 102 responsive to the traffic condition 124 of the first link 110 exceeding the threshold 125. The wireless device 150 can access, responsive to the indication 128, the second link 110 to communicate the at least a portion of the traffic of the wireless device 150.

Figure 5:
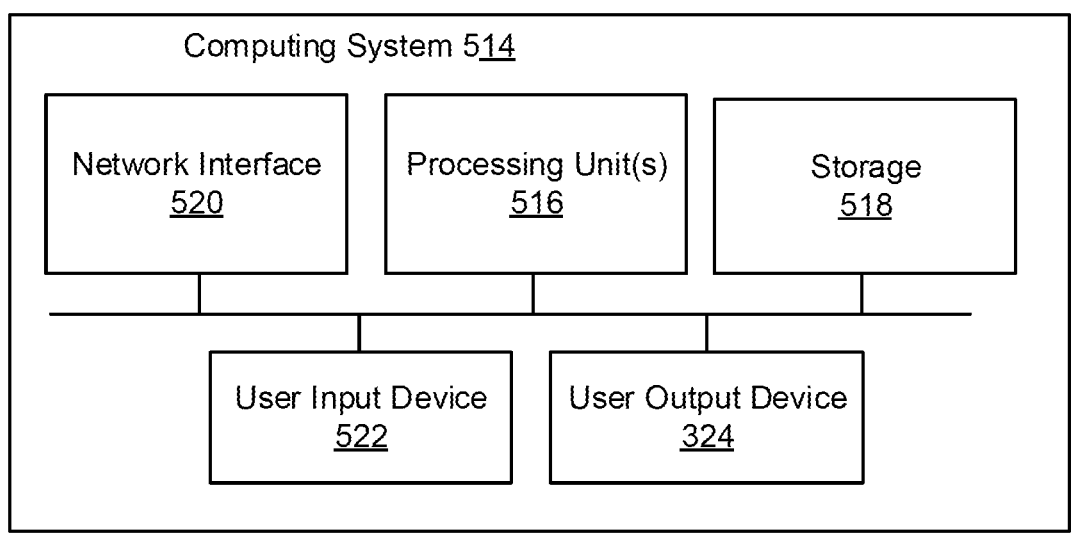
FIG. 5 is a block diagram of a computing environment according to an example implementation of the present disclosure.

Various operations described herein can be implemented on computer systems. FIG. 5 shows a block diagram of a representative computing system 514 usable to implement the present disclosure. In some embodiments, the wireless node 102, wireless device 150 or both of FIG. 1 are implemented by the computing system 514. Computing system 514 can be implemented, for example, as a consumer device such as a smartphone, other mobile phone, tablet computer, wearable computing device (e.g., smart watch, eyeglasses, head wearable display), desktop computer, laptop computer, or implemented with distributed computing devices. The computing system 514 can be implemented to provide VR, AR, MR experience. In some embodiments, the computing system 514 can include conventional computer components such as processors 516, storage device 518, network interface 520, user input device 522, and user output device 524.

Network interface 520 can provide a connection to a wide area network (e.g., the Internet) to which WAN interface of a remote server system is also connected. Network interface 520 can include a wired interface (e.g., Ethernet) and/or a wireless interface implementing various RF data communication standards such as Wi-Fi, Bluetooth, or cellular data network standards (e.g., 3G, 4G, 5G, 60 GHz, LTE, etc.).

User input device 522 can include any device (or devices) via which a user can provide signals to computing system 514; computing system 514 can interpret the signals as indicative of particular user requests or information. User input device 522 can include any or all of a keyboard, touch pad, touch screen, mouse or other pointing device, scroll wheel, click wheel, dial, button, switch, keypad, microphone, sensors (e.g., a motion sensor, an eye tracking sensor, etc.), and so on.

User output device 524 can include any device via which computing system 514 can provide information to a user. For example, user output device 524 can include a display to display images generated by or delivered to computing system 514. The display can incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). A device such as a touchscreen that function as both input and output device can be used. Output devices 524 can be provided in addition to or instead of a display. Examples include indicator lights, speakers, tactile "display" devices, printers, and so on.

Some implementations include electronic components, such as microprocessors, storage and memory that store computer program instructions in a computer readable storage medium (e.g., non-transitory computer readable medium). Many of the features described in this specification can be implemented as processes that are specified as a set of program instructions encoded on a computer readable storage medium. When these program instructions are executed by one or more processors, they cause the processors to perform various operation indicated in the program instructions. Examples of program instructions or computer code include machine code, such as is produced by a compiler, and files including higher-level code that are executed by a computer, an electronic component, or a microprocessor using an interpreter. Through suitable programming, processor 516 can provide various functionality for computing system 514, including any of the functionality described herein as being performed by a server or client, or other functionality associated with message management services.

It will be appreciated that computing system 514 is illustrative and that variations and modifications are possible. Computer systems used in connection with the present disclosure can have other capabilities not specifically described here. Further, while computing system 514 is described with reference to particular blocks, it is to be understood that these blocks are defined for convenience of description and are not intended to imply a particular physical arrangement of component parts. For instance, different blocks can be located in the same facility, in the same server rack, or on the same motherboard. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Implementations of the present disclosure can be realized in a variety of apparatus including electronic devices implemented using any combination of circuitry and software.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit and/or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Systems and methods described herein may be embodied in other specific forms without departing from the characteristics thereof. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The term "coupled" and variations thereof includes the joining of two members directly or indirectly to one another. Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References to "or" can be construed as inclusive so that any terms described using "or" can indicate any of a single, more than one, and all of the described terms. A reference to "at least one of 'A' and 'B'" can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

References herein to the positions of elements (e.g., "top," "bottom," "above," "below") are merely used to describe the orientation of various elements in the FIGURES. The orientation of various elements may differ according to other exemplary embodiments, and that such variations are intended to be encompassed by the present disclosure.

What is claimed is:

1. A method comprising:
receiving, by a wireless device from a wireless node, an advertisement message indicating a set of wireless local area network (WLAN) links that support one or more defined latency requirements, a capability of the wireless node to support the set of WLAN links, a plurality of parameters for the set of WLAN links, an operating mode for the set of WLAN links, and a status for the set of WLAN links;
sending, by the wireless device to the wireless node responsive to the advertisement message, a request to access a first link of the set of WLAN links, the request indicating a capability of the wireless device to interoperate with the wireless node to use the first link, and
accessing, by the wireless device, the first link of the set of WLAN links if the wireless node accepts the request to access the first link.

2. The method of claim 1, wherein the capability of the wireless node includes at least one of:
link admission, link steering or facilitating channel access, of one or more wireless devices.

3. The method of claim 1, comprising:
receiving, by the wireless device from the wireless node, a response accepting or denying the wireless device access to the first link, wherein the response is based on at least a condition of network traffic associated with the wireless node.

4. The method of claim 1, comprising:
receiving, by the wireless device from the wireless node, an indication of a second link to transfer at least a portion of traffic of the wireless device, from the first link to the second link, wherein the indication is responsive to a condition of network traffic associated with the wireless node; and
accessing, by the wireless device responsive to the indication, the second link to communicate the at least a portion of the traffic of the wireless device.

5. The method of claim 1, comprising:
receiving, by the wireless device from the wireless node, an indication of a first plurality of parameters of the plurality of parameters for a plurality of time slots for the set of WLAN links available for prioritized access; and
accessing, by the wireless device, the first link during a first time slot of the plurality of time slots according to the first plurality of parameters.

6. The method of claim 1, wherein the advertisement message includes at least one of: a beacon signal, a probe response or an action frame.

7. A wireless device comprising:
one or more processors configured to:
receive, from a wireless node, an advertisement message indicating a set of wireless local area network (WLAN) links that support one or more defined latency requirements, a capability of the wireless node to support the set of WLAN links, a plurality of parameters for the set of WLAN links, an operating mode for the set of WLAN links, and a status for the set of WLAN links;
send, to the wireless node responsive to the advertisement message, a request to access a first link of the set of WLAN links, the request indicating a capability of the wireless device to interoperate with the wireless node to use the first link, and
access the first link of the set of WLAN links if the wireless node accepts the request to access the first link.

8. The wireless device of claim 7, wherein the capability of the wireless node includes at least one of: link admission, link steering or facilitating channel access, of one or more wireless devices.

9. The wireless device of claim 7, wherein the one or more processors are further configured to:
receive, from the wireless node, an indication of a second link to transfer at least a portion of traffic of the wireless device, from the first link to the second link, wherein the indication is responsive to a condition of network traffic associated with the wireless node; and
access, responsive to the indication, the second link to communicate the at least a portion of the traffic of the wireless device.

10. The wireless device of claim 7, wherein the one or more processors are further configured to:
receive, from the wireless node, a response accepting or denying the wireless device access to the first link, wherein the response is based on at least a condition of network traffic associated with the wireless node.

11. The wireless device of claim 7, wherein the one or more processors are further configured to:
receive, from the wireless node, an indication of a first plurality of parameters of the plurality of parameters for a plurality of time slots for the set of WLAN links available for prioritized access; and
access the first link during a first time slot of the plurality of time slots according to the first plurality of parameters.

12. The wireless device of claim 7, wherein the advertisement message includes at least one of: a beacon signal, a probe response or an action frame.

13. A method comprising:
configuring, by a wireless node, a set of wireless local area network (WLAN) links to support one or more defined latency requirements;
transmitting, by the wireless node to a plurality of wireless devices, an advertisement message indicating the set of WLAN links to support the one or more defined latency requirements, a capability of the wireless node to support the set of WLAN links, a plurality of parameters for the set of WLAN links, an operating mode for the set of WLAN links, and a status for the set of WLAN links; and
receiving, by the wireless node from a first wireless device of the plurality of wireless devices responsive to the advertisement message, a request to access a first link of the set of WLAN links, the request indicating a capability of the wireless device to interoperate with the wireless node to use the first link, wherein the wireless device accesses the first link of the set of WLAN links if the wireless node accepts the request to access the first link.

14. The method of claim 13, wherein the capability of the wireless node includes at least one of: link admission, link steering or facilitating channel access, of one or more wireless devices.

15. The method of claim 13, comprising:
transmitting, by the wireless node to the first wireless device, a response accepting or denying the wireless device access to the first link, wherein the response is based on at least a condition of network traffic associated with the wireless node.

16. The method of claim 13, comprising:
transmitting, by the wireless node to the wireless device, an indication of a second link to transfer at least a portion of traffic of the wireless device, from the first link to the second link, responsive to a condition of network traffic associated with the wireless node, wherein the wireless device accesses, responsive to the indication, the second link to communicate the at least a portion of the traffic of the wireless device.

17. The method of claim 13, comprising
determining, by the wireless node, a condition of network traffic of the set of WLAN links;
determining, by the wireless node, that the wireless device is accessing the first link and a second link of the set of WLAN links; and
determining, by the wireless node, not to transfer at least a portion of traffic of the wireless device from the first link to the second link, responsive to determining that the wireless device is accessing the second link.

18. The method of claim 13, comprising:
configuring, by the wireless node, a time interval into a plurality of time slots for the set of WLAN links having a first plurality of parameters of the plurality of parameters for prioritized access; and
transmitting, by the wireless node to the wireless device, an indication of the first plurality of parameters for the plurality of time slots for the set of WLAN links, wherein the wireless device accesses the first link during a first time slot of the plurality of time slots according to the first plurality of parameters.

19. The method of claim 13, wherein the advertisement message includes at least one of: a beacon signal, a probe response or an action frame.

20. A wireless node comprising:
one or more processors configured to implement the method of claim 13.

* * * * *